US011426966B2

(12) United States Patent
Liu et al.

(10) Patent No.: US 11,426,966 B2
(45) Date of Patent: Aug. 30, 2022

(54) BENDABLE PANEL

(71) Applicant: JETCOAT (SHANGHAI) CO LTD., CHINA, Shanghai (CN)

(72) Inventors: Huihuang Liu, Shanghai (CN); Tungyueh Liu, Shanghai (CN); Juntai Huang, Shanghai (CN); Kuojiun Liu, Shanghai (CN)

(73) Assignee: JETCOAT (SHANGHAI) CO LTD, CHINA, Shanghai (CN)

( * ) Notice: Subject to any disclaimer, the term of this patent is extended or adjusted under 35 U.S.C. 154(b) by 189 days.

(21) Appl. No.: 16/768,175

(22) PCT Filed: Mar. 16, 2018

(86) PCT No.: PCT/CN2018/079232
§ 371 (c)(1),
(2) Date: May 29, 2020

(87) PCT Pub. No.: WO2019/174023
PCT Pub. Date: Sep. 19, 2019

(65) Prior Publication Data
US 2020/0290306 A1 Sep. 17, 2020

(51) Int. Cl.
*B32B 3/06* (2006.01)
*B32B 3/02* (2006.01)
(Continued)

(52) U.S. Cl.
CPC ............... *B32B 3/02* (2013.01); *B32B 3/06* (2013.01); *B32B 27/08* (2013.01); *B32B 27/20* (2013.01); *B32B 27/304* (2013.01); *C08J 5/18* (2013.01); *C08J 7/0427* (2020.01); *C08L 27/06* (2013.01); *C09D 5/14* (2013.01); *C09D 167/04* (2013.01); *B32B 2264/067* (2013.01); *B32B 2264/10* (2013.01); *B32B 2264/12* (2013.01); *B32B 2307/50* (2013.01); *B32B 2318/04* (2013.01); *B32B 2451/00* (2013.01);
(Continued)

(58) Field of Classification Search
CPC .......... B32B 3/06; B32B 27/08; B32B 27/20; B32B 27/304
See application file for complete search history.

(56) References Cited

U.S. PATENT DOCUMENTS

2016/0158995 A1 6/2016 Young et al.

FOREIGN PATENT DOCUMENTS

| CN | 2846116 Y | 12/2006 |
| CN | 103252952 A | 8/2013 |

(Continued)

*Primary Examiner* — Elizabeth E Mulvaney
(74) *Attorney, Agent, or Firm* — Duane Morris LLP; Thomas J. Kowalski; Deborah L. Lu

(57) ABSTRACT

A bendable panel comprising a substrate layer, wherein the panel is provided with a mechanism enabling the panel to bend. The mechanism enabling the panel to bend is at least one groove or cut, and the depth of the groove or cut is no longer than the panel thickness. The substrate layer is prepared by the following materials with the following mass ratio: 100 parts of PVC resin or PVC powder, 30-55 parts of a styrene based elastomer, 150-300 parts of stone powder, sawdust or rock, 1-10 parts of an additive, and 1-4 parts of an elastomer coupling agent. The panel may be bent during the installation, and several panels can be seamlessly installed.

19 Claims, 3 Drawing Sheets

(51) Int. Cl.
  *C08J 7/04* (2020.01)
  *B32B 27/08* (2006.01)
  *B32B 27/20* (2006.01)
  *B32B 27/30* (2006.01)
  *C08J 5/18* (2006.01)
  *C08L 27/06* (2006.01)
  *C09D 5/14* (2006.01)
  *C09D 167/04* (2006.01)

(52) U.S. Cl.
  CPC ....... *B32B 2471/00* (2013.01); *B32B 2607/00* (2013.01); *C08J 2327/06* (2013.01); *C08J 2425/06* (2013.01); *C08J 2467/04* (2013.01); *C08L 2205/03* (2013.01); *C08L 2205/035* (2013.01); *C08L 2205/08* (2013.01)

(56) References Cited

FOREIGN PATENT DOCUMENTS

| | | | |
|---|---|---|---|
| CN | 10477407 | A | 7/2015 |
| CN | 105419159 | A | 3/2016 |
| CN | 105860346 | A * | 8/2016 |
| EP | 2366736 | A1 | 9/2011 |

\* cited by examiner

BENDABLE PANEL

CROSS-REFERENCE TO RELATED APPLICATION

This application is a national stage application under 35 U.S.C. 371 based on international patent application PCT/CN2018/096844, filed on Jul. 24, 2018, the entirety of which is incorporated herein by reference.

TECHNICAL FIELD

The present disclosure is directed to building materials, specifically to bendable panels.

BACKGROUND OF THE DISCLOSURE

Panels are flat rectangle building materials in standard sizes, which are used in the constructions as components forming or set into the surface of the wall, ceiling or floor. Panels are also be metal plates manufactured by forging, rolling, or casting.

The traditional multi-layered panels are prepared by bonding two or more wooden boards with adhesives. Such panels obviously have the following defects. 1. Too much wood is used for making panels. 2. Some boards may be unglued soon after use, resulting in panel warpage. 3. The panels may have poor waterproof and moisture-proof performance. 4. The adhesives as used contain formaldehyde which is harmful to human health. 5. The panels may easily deform and crack. 6. The panels are hard to bend, and, when used as e.g., the table top, will form seams with the coordinating end trim at the edge.

At present, the table or bench usually uses decorative panels on the top surface, but no such panels are arranged on the side surfaces. Alternatively, the table or bench uses decorative panels on both the top surface and the side surfaces, but seams are generated between the panels at the table/bench edges. Dirt and bacteria may be accumulated in the seams, and human body parts touching such seams will be exposed to bacteria.

Conventional multi-layered panels are not easy to bend, or may break after being bent. Thus, they are not applicable to corners or edges where panel bending is needed, especially to corners in the hospitals. As mentioned above, bacteria may grow in seams between panels.

SUMMARY OF THE DISCLOSURE

The present disclosure aims to overcome the above shortcomings and provides a bendable panel which is easy to be installed and can be bent at corners/edges to avoid seam generation and bacteria accumulation in seams.

The present disclosure provides a bendable panel comprising a substrate layer. The panel of the disclosure may be a single-layered panel consisting of a substrate layer, or alternatively a multi-layered composite panel containing at least one substrate layer.

The panel is provided with a mechanism enabling the panel to bend.

The mechanism enabling the panel to bend is at least one groove or cut where the panel may easily bend, the cut is for making a groove when needed. The depth of the groove or cut is no longer than the thickness of the panel, or generally no longer than the thickness of the substrate layer.

The substrate layer is made by the following materials at the following mass ratio:

| | |
|---|---|
| PVC resin or PVC powder | 100 parts; |
| A styrene based elastomer | 30-55 parts; |
| Stone powder, sawdust or rock | 150-300 parts; |
| An additive | 1-10 parts; |
| An elastomer coupling agent | 1-4 parts. |

The additive is one or more selected from the group consisting of a stabilizer, stearic acid, PE wax, chlorinated polyethylene, a modifier, a dye, a brightener and a plasticizer.

The elastomer coupling agent is obtained by polymerization of a polyol, allylic acid, styrene or its derivative, and vinyl chloride.

The mechanism enabling the panel to bend may further contain a bending angle fixing mechanism.

The bending angle fixing mechanism may be arranged inside the groove described above or a groove made from the cut described above.

The bending angle fixing mechanism consists of a primary support part, a secondary support part and an adjusting board. The primary support part is arranged on one side of the groove, and the secondary support part is arranged on the opposite side of the groove.

The adjusting board is a mechanism with the length adjustable. One end of the adjusting board is rotatably fixed onto the primary support part, and the other end is detachably attached to the secondary part. Generally speaking, when the panel is not bent, the adjusting board is disposed in parallel to the primary support part. After the panel is bent, the adjusting board is adjusted to have a suitable length and fastened to the secondary support part, so that the groove becomes larger and two panel portions separated by the groove may be fixed with a certain angle.

In another embodiment, the bending angle fixing mechanism is arranged inside the groove. It consists of a primary support part, a secondary support part and an angle brace. The primary support part is arranged on one side of the groove, and the secondary support part is arranged on the opposite side of the groove. The primary support part and the secondary support part each contains at least one locating hole. The locating holes on the primary and secondary support parts are set in pairs, i.e., the hole number and position in the primary support part match those in the secondary support part.

The angle brace consists of a primary support base and a secondary support base, both provided with locating hole(s). The angle brace may be designed to have the angle adjustable, or alternatively several angle braces having different angles are sold together with the panels.

After the primary support base and the secondary support base are arranged with a certain included angle, the locating holes in the angle brace align with at least one pair of the locating holes in the primary and secondary support bases.

That is, multiple pairs of locating holes are set on the primary and secondary support parts, and an angle brace with a desired angle can be used according to the target angle to be set. When an angle brace with a certain angle is arranged in the groove, then the locating holes in the angle brace are fastened to the locating holes in the primary and secondary support parts. In this way, the angle between the primary and secondary support parts are fixed by the angle brace.

The elastomer coupling agent is prepared by a method comprising the steps of:

1) adding a polyol and allylic acid into a polymerization reactor in turn, reacting the resultant mixture under an acid catalyst for 0.1-0.5 hours at 80-120° C., removing water and obtaining a mixture, wherein the acid catalyst is a protonic acid such as concentrated sulfuric acid, an acid phase transfer catalyst, and the like; and 2) reacting the obtained mixture with styrene or its derivative(s) and vinyl chloride at 120-160° C. at the presence of an initiator for 1-2 hours, raising the temperature to 200-240° C., and allowing the reaction to proceed for another 1-3 hours to obtain the elastomer coupling agent.

The initiator may be magnesium metal, DBU, a ruthenium catalyst and the like.

The polyol, allylic acid, styrene or its derivative(s), and vinyl chloride are at a molar ratio of 1:2-6:5-15:5-15.

The polyol is one or more selected from the group consisting of glycol, 1,2-propanediol, dipropylene glycol, 1,4-butanediol, 1,6-hexanediol, neopentyl glycol, triethylene glycol, diethylene glycol, trihydroxymethyl propane, pentaerythritol and glycerol.

The layers of the panel are subject to one-pass, multi-pass or continuous cold or hot pressing.

The cold or hot pressing is performed at a pressure of 8-12 kg/cm².

The cold or hot pressing is performed for 0.1-360 minutes.

The cold pressing is done at a temperature of 10-35° C.;
The hot pressing is done at a temperature of 60-180° C.

The layers may also be bonded by environment friendly adhesives.

At least one functional layer is provided above and/or below the substrate layer.

The functional layer is one or more selected from the group consisting of a patterned layer, a wear layer, a paint layer, a veneer layer, a thermal insulating layer, a waterproof layer, a skid-proof layer, and an adhesive layer.

The functional layer is one or more selected from the group consisting of a tree bark, a non-woven fabric, a bamboo bark, a wooden board, a bamboo board, a metal board, a WPC board, a PVC board, a LVT board, a calcium silicate board, an aluminum plastic sheet, a plastic sheet, a PVC coiled sheet, a bamboo-wood composite board, a magnesium board, a wood-plastic board, a stone board, a volcanic lime board, a calcium silicon carbonate board, a plastic board, a gypsum board, a glass sheet, a foam board, a melamine sheet, a PVC wear layer, a PVC patterned sheet, a PVC cushion, a PE film and a UV cure coating.

The functional layer is generally made of the plastic such as PVC. In other words, the functional layer is preferably made of the plastic material.

The UV cure coating layer may be one or more selected from the group consisting of a UV wear layer, a UV skid-proof layer, a UV primer, a UV finish, a UV 3D patterned layer, and a UV patterned layer.

The bendable panel of the disclosure may be provided with a coordinating end trim at the edge, which functions to cover the edge.

The bendable panel of the disclosure may be multi-layered and composed of at least two board layers.

The uppermost layer (the top layer) of the panel has an area larger than and thus covers other layer(s), and an end trim is provided to cover all the other layer(s). In other words, the part of the uppermost layer that does not cover the other layer(s) is folded downwards, and covers the lateral sides of the panel.

The uppermost layer of the panel may be further covered with an anti-bacterial coating layer by coating an anti-bacterial paint on the uppermost layer.

The anti-bacterial paint is prepared by the following materials with the following mass percent distribution:

| | |
|---|---|
| Amorphous poly(lactic acid) | 45-60%; |
| An acetate based solvent | 0-30%; |
| A modified film forming agent | 10-25%; |
| An additive | 1-10%; |
| An anti-bacterial granule | 0-3%; |
| A dye | 0-5%. |

The modified film forming agent is one or more selected from the group consisting of acrylic resin-modified casein, acrylic-polyurethane copolymer, polyethylene/acrylate-modified butadiene resin, and polyurethane-modified nitrocellulose.

The additive is one or more selected from the group consisting of a leveling agent, a solvent, a stabilizer, and a heat sensitizer.

The anti-bacterial granule may be one or more selected from the group consisting of nano silver, a negatively charged weak alkaline granule, a de-chlorination electrolyzed granule, a de-formaldehyde granule, and an infrared light-emitting nano ball.

The anti-bacterial paint is prepared by the following materials with the following mass percent distribution:

| | |
|---|---|
| Amorphous poly(lactic acid) | 55-60%; |
| An acetate based solvent | 15-20%; |
| A modified film forming agent | 15-25%; |
| An additive | 7-10%; |
| An anti-bacterial granule | 1-3%; |
| A dye | 2-5%. |

Uses and Effects of the Invention

The present disclosure provides a bendable panel comprising a mechanism enabling the panel to bend. The panel is easy to be installed in e.g., hospitals and can be bent at corners/edges to avoid seam generation and bacteria accumulation in seams.

To avoid surface cracks occurred in panel bending, the panel of the disclosure consists mainly of a special substrate layer, to which ingredients such as elastomers are added to improve the panel's elastic bending property and stress absorption property. When the panel is bent at a certain angle by an external force, the bending stress is absorbed by the panel so that the panel's bending seems to be more natural, enhancing the panel's appearance and internal bending toughness and strength. When the panel is bent at the preset cut or groove, it retains the strength; while a conventional plank may crack when cut or grooved. Further, the inventors of the disclosure discovered during the panel development that that if the traditional panel layer formulation is modified by adding only the elastomer, the elastomer is immiscible with the rest ingredients due to the property differences. As a result, the extrusion molding of the panels will be badly affected, i.e., on one hand, it is hard to perform the extrusion molding, on the other hand, the formed panels are easy to deform. In order to solve the problem, an elastomer coupling agent is introduced into the formulation. With the addition of the elastomer coupling agent, the elastomers are miscible with and well mixed with PVC, stone/wood and other ingredients, which improves the bonding among the ingredients and the overall functionality, so that the products made by extrusion molding can reach the target level.

In addition, the panel of the disclosure is further provided with a bending angle fixing mechanism, such that the bending angle can be further fixed during panel installation. In other words, several panels may bend at a predetermined angle without large deviations caused by e.g., material retraction, or uneven force distribution on the panel during installation.

Further, all the layers of the composite panel of the disclosure contain plastics, so that the panel can be made by compression molding without using adhesives. In this respect, the threat to human health due to formaldehyde release from the adhesive may be removed.

The panel is further provided with a coordinating end trim at the edge so as to cover the lateral side(s) of the panel, resulting in good appearance and better safety and corrosion resistance.

The panel is further provided with an anti-bacterial coating layer which is biodegradable and environment friendly without particular smell. With the anti-bacterial granules in the layer, the panel may kill and eliminate bacteria in the hospital, making hospital facilities cleaner and safer. The paint for forming the layer has good anti-tear and anti-scratch performance. The anti-bacterial layer can protect the layer(s) below it. Further, the layer can be well stretched and thus can protect the bending part of the panel, reducing or eliminating the crack and aging problems at that part. The anti-bacterial coating layer can be washed with water, and is especially suitable for use in hospitals.

DETAILED DESCRIPTION OF THE DISCLOSURE

Example 1. Bendable Panel 1#

Figure 1:
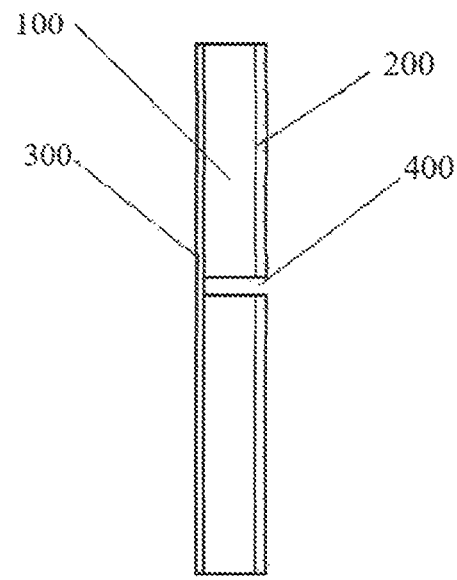
FIG. 1 is a schematic diagram of bendable panel 1# in Example 1.

As shown in FIG. 1, bendable panel 1# was composed of a substrate layer 1# (100), a veneer layer (200) and a wear layer (300). The substrate layer 100, the veneer layer 200 and the wear layer 300 were subject to hot pressing (8-12 kg/cm², 60° C., 25 minutes) to prepare the bendable panel 1#.

The veneer layer was a PVC veneer with a thickness of 0.10 mm, and provided above the substrate layer.

The wear layer was a PVC wear layer, 0.20 mm thick, provided below the substrate layer.

A groove 400 was dug on the bottom of the bendable panel 1# towards the upper surface.

Figure 2:
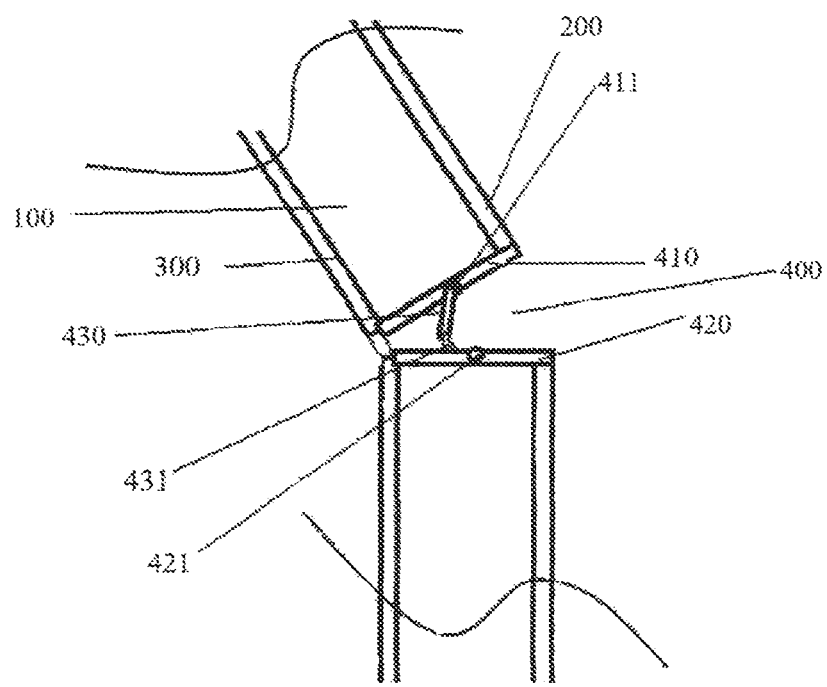
FIG. 2 is a schematic diagram of bendable panel 1# with a bending angle fixing mechanism in Example 1.

As shown in FIG. 2, a bending angle fixing mechanism was arranged inside the groove 400, which contained a primary support part 410, a secondary support part 420 and a rotatable fixing board 430.

The primary support part 410 was provided with a roller bearing 411.

The secondary support part 420 was provided with a fixing board 421.

One end of the rotatable fixing board 430 may rotatably fixed to the roller bearing 411, and the other end was provided with a fastener 431 which may fit into the fixing board 421 to fix the included angle between two sides of the groove.

The length of the rotatable fixing board 430 was adjustable. The rotatable fixing board 430 may be, for example, composed of two segments, one with a chute, and the other with a knob. The length of the rotatable fixing board 430 may be adjusted by sliding the knob along the chute and then screwing down the knob tightly.

The substrate layer 1#, 0.5 mm thick, was prepared by mixing the following materials at a specified mass ratio and subjecting the mixture to extrusion molding.

| | |
|---|---|
| PVC resin | 100 parts; |
| TPEE | 35 parts; |
| Stone powder | 180 parts; |
| Perlite | 60 parts; |
| A stabilizer | 2 parts; |
| Stearic acid | 0.8 part; |
| PE wax | 0.2 part; |
| ACR (Acrylic impact modifier) | 2 parts; |
| Titanium dioxide | 1 part; |
| A brightener | 0.01 part; |
| Elastomer coupling agent 1# | 3 parts. |

The elastomer coupling agent 1# was prepared by adding 1 eq glycol and 2 eq allylic acid into a polymerization reactor in turn, reacting the resultant mixture at the presence of a phase transfer catalyst for 0.5 hour at 120° C., raising the temperature to 160° C., adding to the reactor 5 eq styrene, 5 eq vinyl chloride and an alkali, reacting the obtained mixture for 1 hour, raising the temperature to 240° C., and allowing the reaction to proceed for 1.5 hours.

During panel installation, the panel was bent, had the bending angle fixed by the bending angle fixing mechanism, and then installed onto the wall or floor.

The bendable panel 1# was tested for its properties in comparison to composite panel 01#. The composite panel 01# did not contain ingredients for improving panel properties, and had its layers bonded by adhesives as it cannot be prepared by hot pressing.

A. Formaldehyde Release Test

A room was floored with 100 m² of either kind of the panels, and then door(s) and window(s) were closed. An air-conditioning was used to raise the room temperature to 28° C. 120 hours later, no formaldehyde was detected in the room with the bendable panel 1# while the formaldehyde level was 0.13 mg/m² in the room with the composite panel 01#.

B. Bending Test

The panels were repeatedly bent with an included angle of 15°. After bent for 18 times, the panels were tested for the deformation extent of the patterns at the bending site. It was found that the pattern deformation was almost negligible in the bendable panel 1#, and the bending site seemed to be normal in color. In contrast, the pattern deformation extent was proved to be 56.9%, and the panel turned white and cracked at the bending site.

C. Elasticity test

The bendable panel 1# was able to proceed with elastic deformation with applied forces and recovered quickly upon force removal, and the surface deformation extent was less than 0.01%. The composite panel 01# cannot proceed with elastic deformation under stress condition.

Example 2. Bendable Panel 2#

Figure 3:
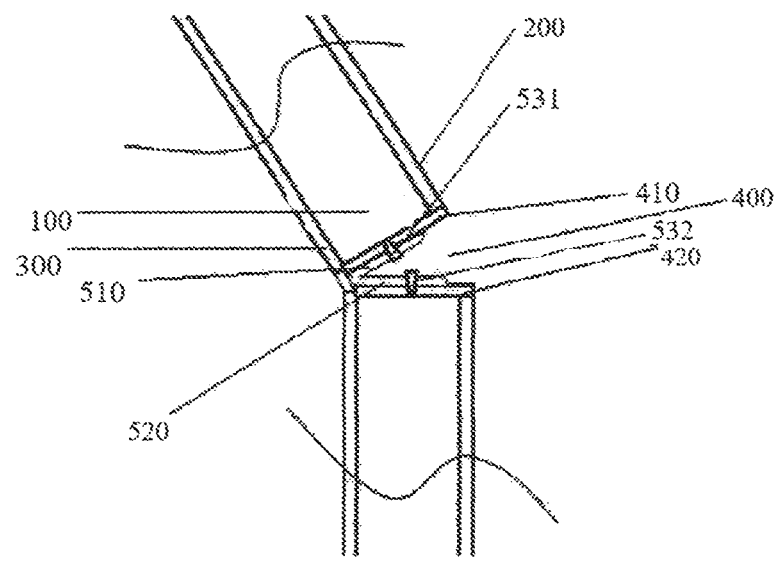
FIG. 3 is a schematic diagram of bendable panel 2# in Example 2.

As shown in FIG. 3, bendable panel 2# was composed of a substrate layer 2# (100), a veneer layer (200) and a lower wear-resistant layer (300). The substrate layer 100, the veneer layer 200 and the wear layer 300 were subject to hot pressing (8-12 kg/cm², 60° C., 25 minutes) to prepare the bendable panel 2#.

The veneer layer was a PVC wood-like veneer, 0.05 mm thick, provided above the substrate layer.

The lower wear layer was a PVC wear layer with a thickness of 0.15 mm, provided below the substrate layer.

A groove 400 was dug on the bottom of the bendable panel 2# towards the upper surface.

The groove 400 consisted of a primary support part 410 and a secondary support part 420.

Figure 4:
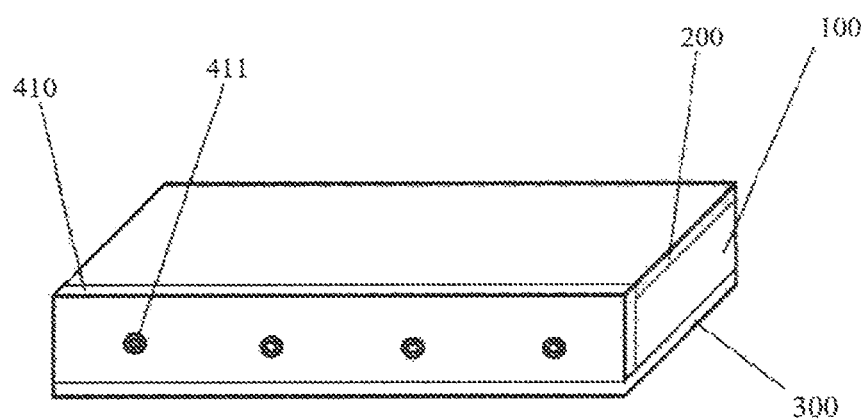
FIG. 4 is a side schematic view of the groove in bendable panel 2# of Example 2.

The primary support part 410 was shown in FIG. 4 as an example, which was provided with several screw holes 411. The secondary support part 420 had a similar structure.

As shown in FIG. 3, an angle brace was arranged inside the groove 400 to fix the included angle between the two support parts.

Figure 5:
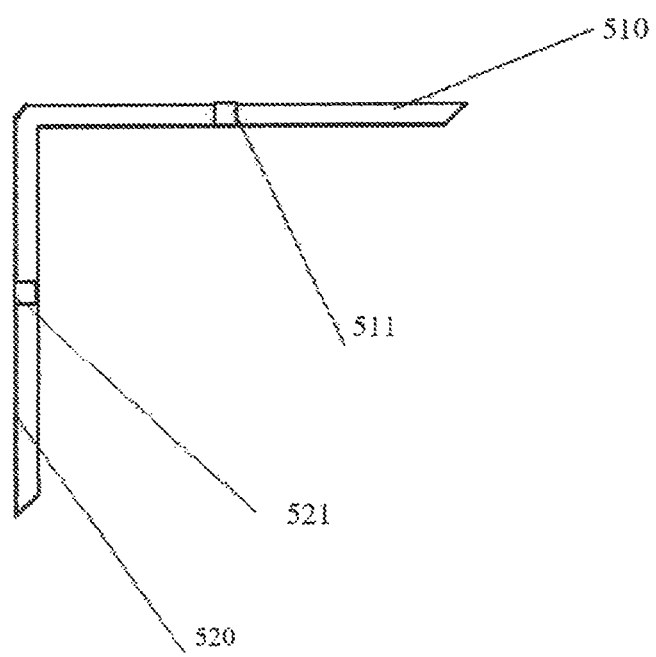
FIG. 5 is a schematic diagram of an angle brace for bendable panel 2# of Example 2.

As shown in FIG. 5, the angle brace contained a primary support base 510 and a secondary support base 520.

The primary support base 510 and the secondary support base 520 may form an included angle of a certain degree as needed.

The primary support base 510 was provided with holes 511.

The secondary support base 520 was provided with holes 521.

As shown in FIG. 3, during panel installation, a proper brace was inserted into the groove 400, and screws 531 were pushed across the holes in the angle brace and then into the screw holes in the primary and secondary support parts to fix the angle.

The substrate layer 2#, 0.5 in thickness, was prepared by mixing the following materials at a specified mass ratio and subjecting the mixture to extrusion molding.

| PVC resin | 100 parts; |
| TPE | 55 parts; |
| Sawdust | 280 parts; |
| A stabilizer | 1.5 parts; |
| Stearic acid | 1.5 parts; |
| PE wax | 1 part; |
| Chlorinated polyethylene | 1.5 parts; |
| ACR | 3 parts; |
| An antioxidant | 0.5 part; |
| A dye | 1 part; |
| Elastomer coupling agent 2# | 1 part. |

The elastomer coupling agent 2# was prepared by adding 1 eq glycol and 2 eq allylic acid into a polymerization reactor in turn, reacting the resultant mixture at the presence of concentrated sulfuric acid for 0.2 hour at 100° C., raising the temperature to 120° C., adding to the reactor 10 eq styrene, 15 eq vinyl chloride and an initiator, reacting the obtained mixture for 1 hour, raising the temperature to 200° C., and allowing the reaction to proceed for 3 hours.

Example 3. Bendable Panel 3#

Bendable panel 3# was composed of a substrate layer 3#, a patterned layer, a wear layer, a waterproof layer and a skid-proof layer. These layers were subject to hot pressing (8-12 kg/cm², 80° C., 15 minutes) to prepare the bendable panel 3#. The uppermost layer was further coated with a UV cure paint.

The patterned layer was a PVC patterned sheet, 0.1 mm thick and provided above the substrate layer.

The wear layer was a transparent PVC wear layer, 0.15 mm thick, provided above the patterned layer.

The waterproof layer was a board made of waterproof material, 0.1 mm thick, provided right below the substrate layer.

The skid-proof layer was made of PVC and had tire tread patterns, 0.2 mm thick, provided below the waterproof layer.

There was a cut made from the bottom of the bendable panel 3# towards the top of the panel, the cut was arranged for making a groove later.

The substrate layer 3# was prepared by mixing the following materials at a specified mass ratio and subjecting the mixture to extrusion molding, 0.3 mm thick.

| PVC powder | 100 parts; |
| Polystyrene elastomer | 45 parts; |
| Sawdust | 270 parts; |
| Perlite | 80 parts; |
| A stabilizer | 1 part; |
| Stearic acid | 0.3 part; |
| PE wax | 1 part; |
| Elastomer coupling agent 3# | 0.5 part. |

The elastomer coupling agent 3# was prepared by adding 1 eq triethylene glycol and 2.5 eq allylic acid into a polymerization reactor in turn, reacting the resultant mixture at the presence of concentrated sulfuric acid for 0.2 hour at 100° C., raising the temperature to 160° C., adding to the reactor 15 eq styrene, 5 eq vinyl chloride and an initiator, reacting the obtained mixture for 1 hour, raising the temperature to 240° C., and allowing the reaction to proceed for 1.2 hours.

Example 4. Bendable Panel 4#

Bendable panel 4# was composed of a substrate layer 4#, a patterned layer, a wear layer, a waterproof layer and a skid-proof layer. These layers were subject to hot pressing (8-12 kg/cm², 80° C., 15 minutes) to prepare the bendable panel 4#. The uppermost layer was further coated with anti-bacterial paint 4#.

The patterned layer was a PVC patterned sheet, 0.1 mm thick and provided above the substrate layer.

The wear layer was a transparent PVC wear layer, 0.15 mm thick, provided above the patterned layer.

The waterproof layer was a board made of waterproof material, 0.1 mm thick, provided right below the substrate layer.

The skid-proof layer was made of PVC and had tire tread patterns, 0.2 mm thick, provided below the waterproof layer.

There was a cut made from the bottom of the bendable panel 4# towards the top of the panel, the cut was arranged for making a groove later.

The substrate layer 4# was prepared by mixing the following materials at a specified mass ratio and subjecting the mixture to extrusion molding, 0.3 mm thick.

| PVC powder | 100 parts; |
| TPO | 30 parts; |

-continued

| | |
|---|---|
| Sawdust | 240 parts; |
| Perlite | 30 parts; |
| A stabilizer | 1 part; |
| Stearic acid | 1.3 part; |
| PE wax | 2 part; |
| A heat sensitizer | 1 parts; |
| A dye | 0.8 part; |
| Elastomer coupling agent 2# | 4 parts. |

The anti-bacterial paint 4# was made of the following materials with the specified mass percent distribution.

| | |
|---|---|
| Amorphous poly(lactic acid) | 45%; |
| Acetate | 30%; |
| Granacrysil BAS | 10%; |
| A leveling agent | 5%; |
| A photostabilizer | 4%; |
| Nano silver | 1%; |
| White dye | 5%. |

The bendable panel 4# was compared with composite panel 02# without a cross-linking layer (prepared by hot pressing) for the following properties.

A. Formaldehyde Release Test

Neither panel released detectable formaldehyde.

B. Bending Test

The panels were repeatedly bent with an included angle of 15°. After bent for 20 times, the panels were tested for the deformation extent of the patterns at the bending site. It was found that the pattern deformation was almost negligible for the bendable panel 4#, and the bending site seemed to be normal in color. In contrast, the pattern deformation extent of the composite panel 02# was 45.3%, and the panel turned white and cracked at the bending site.

C. Tear Strength Test

The panels were soaked for a whole day, and then dried by hot blowing air. After the procedure was repeated for 25 times, the layers were hard to be separated from each other in the bendable panel 4#. In contrast, the veneer layer of the composite panel 02# was found in loose contact with the substrate layer, and the marginal part may be peeled off. After the procedure was repeated for 100 times, the layers were still hard to be separated from each other in the bendable panel 4# while the veneer layer of the composite panel 02# can be peeled off the substrate layer.

D. Wear Test

The panels were wiped by a wet cloth every 30 minutes. After 150 wipes, the bendable panel 4#'s surface was not different from that before the test, while the composite panel 2#'s surface bulged.

E. Anti-Bacterial Test

Two test panels were placed in an emergency room. 24 hours later, bacteria quantity per 1 $cm^2$ was determined. It turned out that the bacteria quantity on the composite panel 02# was $10^4$ times as much as that on the bendable panel 4#. 48 hours later, bacteria quantity per 1 $cm^2$ was further determined, and the bacteria quantity on the composite panel 02# was $10^8$ times as much as that on the bendable panel 4#.

Example 5. Bendable Panel 5#

Bendable panel 5# was composed of a substrate layer 5#, a patterned layer, a wear layer, a waterproof layer and a skid-proof layer. These layers were subject to hot pressing (8-12 $kg/cm^2$, 80° C., 15 minutes) to prepare the bendable panel 5#. The uppermost layer was further coated with anti-bacterial paint 5#.

The patterned layer was a PVC patterned sheet, 0.1 mm thick and provided above the substrate layer.

The wear layer was a transparent PVC wear layer, 0.15 mm thick, provided above the patterned layer.

The waterproof layer was a board made of waterproof material, 0.1 mm thick, provided right below the substrate layer.

The skid-proof layer was made of PVC and had tire tread patterns, 0.2 mm thick, provided below the waterproof layer.

There was a cut made from the bottom of the bendable panel 5# towards the top of the panel, the cut was arranged for making a groove later.

The anti-bacterial paint 5# was made of the following materials each with the specified mass percent distribution.

| | |
|---|---|
| Amorphous poly(lactic acid) | 50%; |
| Methyl acetate | 25%; |
| Granacrysil BAS | 15%; |
| A leveling agent | 1%; |
| A heat stabilizer | 1%; |
| A photo-initiator | 1%; |
| Infrared light-emitting granules | 2%; |
| White dye | 5%. |

Example 6. Bendable Panel 6#

Bendable panel 6# was composed of a substrate layer 1#, a PVC patterned layer, a PVC wear layer, and a PVC skid-proof film. These layers were subject to continuous hot pressing to prepare the bendable panel 6#. The top and bottom layers were coated with an anti-bacterial paint.

The substrate layer 1# was 3.0 mm thick.

The PVC patterned layer was 0.07 mm thick and provided above the substrate layer 1#.

The PVC wear layer was 0.3 mm thick and provided above the PVC patterned layer.

The PVC skid-proof film was 0.2 mm thick and provided below the substrate layer 1#.

There was a groove made from the bottom of the bendable panel 6# towards the top of the panel, and a bending angle fixing mechanism as described in Example 1 was used.

The anti-bacterial paint 6# was made of the following materials each with the specified mass percent distribution.

| | |
|---|---|
| Amorphous poly(lactic acid) | 60%; |
| Ethanol | 5%; |
| Granacrysil BAS | 25%; |
| A leveling agent | 1%; |
| A heat stabilizer | 1%; |
| A photo-initiator | 1%; |
| Negatively charged weak alkaline granules | 2%; |
| White dye | 5%. |

The invention claimed is:

1. A bendable panel, comprising a substrate layer, wherein:

the panel is provided with a mechanism enabling the panel to bend, the mechanism enabling the panel to bend is at least one groove or cut, the cut is for making a groove, the depth of the groove or cut is no longer than the thickness of the panel, the substrate layer is prepared by the following materials at the following mass ratio:

| | |
|---|---|
| PVC resin or PVC powder | 100 parts; |
| A styrene based elastomer | 30-55 parts; |
| Stone powder, sawdust or rock | 150-300 parts; |
| An additive | 1-10 parts; |
| An elastomer coupling agent | 1-4 parts, | the additive is one or more selected from the group consisting of a stabilizer, stearic acid, PE wax, chlorinated polyethylene, a modifier, a dye, a brightener and a plasticizer, the elastomer coupling agent is obtained by polymerization of a polyol, allylic acid, styrene or its derivative, and vinyl chloride.

2. The bendable panel of claim 1, wherein the mechanism enabling the panel to bend further contains a bending angle fixing mechanism.

3. The bendable panel of claim 2, wherein:
the bending angle fixing mechanism is arranged inside of the groove,
the bending angle fixing mechanism consists of a primary support part, a secondary support part and an adjusting board,
the primary support part is arranged on one side of the groove, and the secondary support part is arranged on the opposite side of the groove,
the adjusting board is a mechanism having an adjustable length,
one end of the adjusting board is rotatably fixed onto the primary support part, and the other end is detachably attached to the secondary part.

4. The bendable panel of claim 2, wherein:
the bending angle fixing mechanism is arranged inside of the groove,
the bending angle fixing mechanism consists of a primary support part, a secondary support part and an angle brace,
the primary support part is arranged on one side of the groove, and the secondary support part are arranged on the opposite side of the groove,
the primary support part and the secondary support part contain at least one locating hole respectively,
the locating hole(s) on the primary and secondary support parts are set in pairs,
the angle brace consists a primary support base and a secondary support base, both provided with locating holes,
the primary support base and the secondary support base form an included angle, the locating holes in the angle brace match at least one pair of locating holes in the primary and secondary support bases.

5. The bendable panel of claim 1, wherein the elastomer coupling agent is prepared by a method comprising the steps of:
1) adding a polyol and allylic acid into a polymerization reactor in turn, reacting the resultant mixture under an acid catalyst for 0.1-0.5 hours at 80-120° C., removing water and obtaining a mixture, and
2) reacting the obtained mixture with styrene or its derivative(s) and vinyl chloride at 120-160° C. at the presence of an initiator for 1-2 hours, raising the temperature to 200-240° C., and allowing the reaction to proceed for another 1-3 hours to obtain the elastomer coupling agent.

6. The bendable panel of claim 5, wherein the polyol, allylic acid, styrene or its derivative(s), and vinyl chloride are at a molar ratio of 1:2-6:5-15:5-15.

7. The bendable panel of claim 5, wherein the polyol is one or more selected from the group consisting of glycol, 1,2-propanediol, dipropylene glycol, 1,4-butanediol, 1,6-hexanediol, neopentyl glycol, triethylene glycol, diethylene glycol, trihydroxymethyl propane, pentaerythritol and glycerol.

8. The bendable panel of claim 1, wherein:
the layer is subject to one-pass, multi-pass or continuous cold or hot pressing,
the cold or hot pressing is performed at a pressure of 8-12 kg/cm2,
the cold or hot pressing is performed for 0.1-360 minutes,
the cold pressing is done at a temperature of 10-35° C.,
the hot pressing is done at a temperature of 60-180° C.

9. The bendable panel of claim 1, wherein at least one functional layer is arranged above and/or below the substrate layer.

10. The bendable panel of claim 9, wherein the functional layer is one or more selected from the group consisting of a patterned layer, a wear layer, a paint layer, a veneer layer, a thermal insulating layer, a waterproof layer, a skid-proof layer, and an adhesive layer.

11. The bendable panel of claim 9, wherein the functional layer is one or more selected from the group consisting of a tree bark, a non-woven fabric, a bamboo bark, a wooden board, a bamboo board, a metal board, a WPC board, a PVC board, a LVT board, a calcium silicate board, an aluminum plastic sheet, a plastic sheet, a PVC coiled sheet, a bamboo-wood composite board, a magnesium board, a wood-plastic board, a stone board, a volcanic lime board, a calcium silicon carbonate board, a plastic board, a gypsum board, a glass sheet, a foam board, a melamine sheet, a PVC wear layer, a PVC patterned sheet, a PVC cushion, a PE film and a UV cure coating layer.

12. The bendable panel of claim 11, wherein the UV cure coating layer may be one or more selected from the group consisting of a UV wear layer, a UV skid-proof layer, a UV primer, a UV finish, a UV 3D patterned layer, and a UV patterned layer.

13. The bendable panel of claim 1, wherein the bendable panel is provided with a coordinating end trim at the edge.

14. The bendable panel of claim 13, wherein the bendable panel is composed of at least two layers, and the top layer has an area larger than and covers other layer(s), and an end trim is on the edge of the other layer(s).

15. The bendable panel of claim 14, wherein:
the top layer of the panel is provided with an anti-bacterial coating layer,
the anti-bacterial coating layer is formed by coating on the top layer an anti-bacterial paint,
the anti-bacterial paint is prepared by mixing the following materials with the following mass percent distribution:

| | |
|---|---|
| Amorphous poly(lactic acid) | 45-60%; |
| An acetate based solvent | 0-30%; |
| A modified film forming agent | 10-25%; |
| An additive | 1-10%; |
| An anti-bacterial granule | 0-3%; |
| A dye | 0-5%. |

16. The bendable panel of claim 15, wherein the modified film forming agent is one or more selected from the group consisting of acrylic resin-modified casein, acrylic-polyurethane copolymer, polyethylene/acrylate-modified butadiene resin, and polyurethane-modified nitrocellulose.

17. The bendable panel of claim 15, where the additive is one or more selected from the group consisting of a leveling agent, a solvent, a stabilizer, and a heat sensitizing agent.

18. The bendable panel of claim 15, wherein the anti-bacterial granule is be one or more selected from the group consisting of a nano silver granule, a negatively charged weak alkaline granule, a de-chlorination electrolyzed granule, a de-formaldehyde granule, and an infrared light-emitting nano ball.

19. The decorative panel of claim 15, wherein the anti-bacterial paint is prepared by mixing the following materials with the following mass percent distribution:

| | |
|---|---|
| Amorphous poly(lactic acid) | 55-60%; |
| An acetate based solvent | 15-20%; |
| A modified film forming agent | 15-25%; |
| An additive | 7-10%; |
| An anti-bacterial granule | 1-3%; |
| A dye | 2-5%. |

\* \* \* \* \*